(12) United States Patent
Li et al.

(10) Patent No.: US 11,187,937 B2
(45) Date of Patent: Nov. 30, 2021

(54) COLOR FILTER, FABRICATION METHOD THEREOF, DISPLAY PANEL AND DISPLAY DEVICE

(71) Applicants: BOE Technology Group Co., Ltd., Beijing (CN); Chongqing BOE Optoelectronics Technology Co., Ltd., Chongqing (CN)

(72) Inventors: Min Li, Beijing (CN); Ruilin Bi, Beijing (CN); Yuanhong Peng, Beijing (CN); Qiang Xiong, Beijing (CN)

(73) Assignees: BOE Technology Group Co., Ltd., Beijing (CN); Chongqing BOE Optoelectronics Technology Co., Ltd., Chongqing (CN)

( * ) Notice: Subject to any disclaimer, the term of this patent is extended or adjusted under 35 U.S.C. 154(b) by 496 days.

(21) Appl. No.: 16/098,993

(22) PCT Filed: Feb. 11, 2018

(86) PCT No.: PCT/CN2018/076301
§ 371 (c)(1),
(2) Date: Nov. 5, 2018

(87) PCT Pub. No.: WO2018/218994
PCT Pub. Date: Dec. 6, 2018

(65) Prior Publication Data
US 2021/0165271 A1 Jun. 3, 2021

(30) Foreign Application Priority Data
May 31, 2017 (CN) .......................... 201710398694.2

(51) Int. Cl.
*G02F 1/1335* (2006.01)
*G02F 1/1339* (2006.01)

(52) U.S. Cl.
CPC .... *G02F 1/133516* (2013.01); *G02F 1/13398* (2021.01); *G02F 1/133512* (2013.01)

(58) Field of Classification Search
CPC ........... G02F 1/133516; G02F 1/13398; G02F 1/133514; G02B 5/22; G02B 5/286; G09G 2300/0452
See application file for complete search history.

(56) References Cited

U.S. PATENT DOCUMENTS

| 5,642,176 A | 6/1997 | Abukawa et al. |
| 2003/0007111 A1 | 1/2003 | Hsu et al. |

(Continued)

FOREIGN PATENT DOCUMENTS

| CN | 1667455 A | 9/2005 |
| CN | 1836188 A | 9/2006 |

(Continued)

OTHER PUBLICATIONS

Chinese Office Action for counterpart CN201710398694.2 dated Oct. 29, 2018.

(Continued)

*Primary Examiner* — Angela K Davison
(74) *Attorney, Agent, or Firm* — Arent Fox LLP; Michael Fainberg

(57) ABSTRACT

Disclosed are a color filter, a fabrication method thereof, a display panel and a display device. The color filter comprises a plurality of filter units distributed in an array; each filter unit comprises: a substrate and a color film layer arranged on the substrate; the color film layer comprises a red color film, a green color film, a blue color film and a white color film; and the areas of the red color film, the green color film and the blue color film are all larger than the area of the white color film.

18 Claims, 4 Drawing Sheets

(56) References Cited

U.S. PATENT DOCUMENTS

| | | | |
|---|---|---|---|
| 2004/0046725 A1* | 3/2004 | Lee .................... | G09G 3/3607 |
| | | | 345/88 |
| 2005/0068281 A1 | 3/2005 | Shin et al. | |
| 2010/0141568 A1* | 6/2010 | Lee .................. | G02F 1/133514 |
| | | | 345/88 |
| 2016/0202546 A1* | 7/2016 | Kim .................... | G02F 1/1368 |
| | | | 257/91 |
| 2017/0131608 A1 | 5/2017 | Jin | |

FOREIGN PATENT DOCUMENTS

| | | |
|---|---|---|
| CN | 2852188 Y | 12/2006 |
| CN | 202049251 U | 11/2011 |
| CN | 104701354 A | 6/2015 |
| CN | 105551390 A | 5/2016 |
| CN | 106200104 A | 12/2016 |
| CN | 106324923 A | 1/2017 |
| CN | 106970438 A | 7/2017 |

OTHER PUBLICATIONS

International Search Report for PCT/CN2018/076301 dated Apr. 10, 2018.
Office Action for corresponding Chinese Application 201710398694.2 dated May 8, 2019.
Song, "Printing and Dyeing CAD-CAM", Mar. 31, 2015, pp. 34-45.
The Tenth Volume of Handbook of Measurement Technology, Feb. 28, 1997, p. 223.

* cited by examiner

COLOR FILTER, FABRICATION METHOD THEREOF, DISPLAY PANEL AND DISPLAY DEVICE

The present application is a National Stage of International Application No. PCT/CN2018/076301, filed Feb. 11, 2018, which claims the priority from Chinese Patent Application No. 201710398694.2, filed with the Chinese Patent Office on May 31, 2017 and entitled "Color Filter, Fabrication Method thereof, Display Panel and Display Device", both of which are hereby incorporated by reference in their entireties.

FIELD

The disclosure relates to the field of display technologies and particularly to a color filter, a fabrication method thereof, a display panel and a display device.

BACKGROUND

The thin film transistor liquid crystal display has been widely applied because of its characteristics such as small volume, low power consumption, no radiation and the like. Its display panel includes a color film substrate and an array substrate arranged by box aligning, and liquid crystals filled between the color film substrate and the array substrate. Here, the Color Filter (CF) is an important element for implementing the display of the color pictures in the color film substrate.

BRIEF SUMMARY

An embodiment of the disclosure provides a color filter, which includes: a substrate and a plurality of color film layers distributed in an array and arranged on the substrate;

the color film layers include: a red color film, a green color film, a blue color film and a white color film;

an area of each of the red color film, the green color film and the blue color film is larger than an area of the white color film.

In a possible implementation, and in the above-mentioned color filter provided by the embodiment of the disclosure, the ratio of the overall transmittance of the red color film, the green color film and the blue color film to the transmittance of the white color film is 49:51, and the color temperature of the color filter is 10000K; wherein, a transmittance of each color film is a product of an aperture ratio of the color film with a material transmittance of the color film.

In a possible implementation, and in the above-mentioned color filter provided by the embodiment of the disclosure, the area ratio of the red color film, the green color film, the blue color film and the white color film is 1.03:1.06:1.0:0.95.

In a possible implementation, and in the above-mentioned color filter provided by the embodiment of the disclosure, the shapes of the red color film, the green color film, the blue color film and the white color film are same.

In a possible implementation, and in the above-mentioned color filter provided by the embodiment of the disclosure, the color filter further includes: a light shielding layer arranged on the substrate and configured to space the red color film, the green color film, the blue color film and the white color film, a planar layer arranged at one side of the color film layers and the light shielding layer back on to the substrate, and a plurality of spacers arranged at one side of the planar layer back on to the color film layers and the light shielding layer.

In a possible implementation, and in the above-mentioned color filter provided by the embodiment of the disclosure, the materials of the white color film are same as the materials of the planar layer; or the materials of the white color film are same as the materials of the spacers.

An embodiment of the disclosure further provides a display panel which includes any color filter described above.

An embodiment of the disclosure provides a display device which includes the display panel described above.

An embodiment of the disclosure provides a fabrication method of the color filter, which includes:

determining a ratio of aperture ratios of a red color film, a green color film, a blue color film and a white color film according to a preset transmittance and color temperature of the color filter;

forming a color film layer including the red color film, the green color film, the blue color film and the white color film on a substrate in accordance with the determined ratio of the aperture ratios of the red color film, the green color film, the blue color film and the white color film; wherein, the aperture ratios of the red color film, the green color film and the blue color film are all larger than the aperture ratio of the white color film.

In a possible implementation, and in the above-mentioned fabrication method provided by the embodiment of the disclosure, determining a ratio of aperture ratios of a red color film, a green color film, a blue color film and a white color film according to a preset transmittance and color temperature of the color filter, includes:

determining color coordinates of all color films according to materials of all the color films;

determining the ratio of the aperture ratios of the red color film, the green color film, the blue color film and the white color film according to a relation between the color coordinates and color temperatures of all the color films, a relation between the aperture ratios and transmittances of all the color films, a relation between the transmittances and the color coordinates, and the preset transmittance and color temperature of the color filter.

In a possible implementation, and in the above-mentioned fabrication method provided by the embodiment of the disclosure, determining a ratio of aperture ratios of a red color film, a green color film, a blue color film and a white color film according to a preset transmittance and color temperature of the color filter, includes:

determining that the ratio of the aperture ratios of the red color film, the green color film, the blue color film and the white color film is 1.03:1.06:1.0:0.95 when a preset ratio of an overall transmittance of the red color film, the green color film and the blue color film to a transmittance of the white color film in the color filter is 49:51 and a color temperature of the color filter is 10000K.

In a possible implementation, and in the above-mentioned fabrication method provided by the embodiment of the disclosure, before forming the color film layer on the substrate in accordance with the determined ratio of the aperture ratios of the red color film, the green color film, the blue color film and the white color film, the fabrication method further includes:

forming a pattern of a light shielding layer on the substrate.

In a possible implementation, and in the above-mentioned fabrication method provided by the embodiment of the disclosure, after forming the color film layer on the substrate in accordance with the determined ratio of the aperture ratios of the red color film, the green color film, the blue color film and the white color film, the fabrication method further includes:

forming a planar layer at one side of the light shielding layer and the color film layer back on to the substrate;

forming a plurality of spacers at one side of the planar layer back on to the light shielding layer and the color film layer.

In a possible implementation, and in the above-mentioned fabrication method provided by the embodiment of the disclosure, the materials of the white color film are same as the materials of the planar layer; or the materials of the white color film are same as the materials of the spacers.

DETAILED DESCRIPTION OF THE EMBODIMENTS

The mainstream display at this stage employs the color filter of three primary colors of red, green and blue, but the color film itself may have a certain absorption function for the backlight, so the transmittance thereof is relatively low, causing the low display brightness. Thus a new color film, i.e., four-color color film of red, green, blue and white, is proposed. Since the transmittance of the white color film is relatively high, the overall transmittance of the color filter can be increased greatly. Also since the transmittance of the white color film is relatively high, the color saturation of the panel is relatively low, and the display quality is lower than the display quality of the three-color color film of red, green and blue.

There are several ways of increasing the color saturation in the related art, for example, the green color film with the high transmittance is developed and configured to increase the saturation of three primary colors, and the difficulty of increasing the color film transmittance is relatively large, so the improvement degree of the display quality is limited. As another example, the color film thickness of three primary colors of red, green and blue is reduced to increase the transmittance of three primary colors, but the using of this method may cause the lowering of the display color gamut, so it is very difficult to achieve the purpose of increasing the color saturation by way of adjusting the color film thickness in the case of ensuring that the display color gamut is not changed.

The embodiments of the disclosure provides a color filter, a fabrication method thereof, a display panel and a display device, so as to increase the display color saturation and improve the display quality.

In order to make the purposes, technical solutions and advantages of the disclosure clearer, the disclosure will be further described in details below in combination with the accompanying drawings. Obviously the described embodiments are a part of the embodiments of the disclosure but not all the embodiments. Based upon the embodiments in the disclosure, all of other embodiments obtained by those ordinary skilled in the art without creative work pertain to the protection scope of the disclosure.

The color filter, the fabrication method thereof and the display device provided by the specific embodiments of the disclosure will be introduced in details below in combination with the accompanying drawings.

Figure 1A:
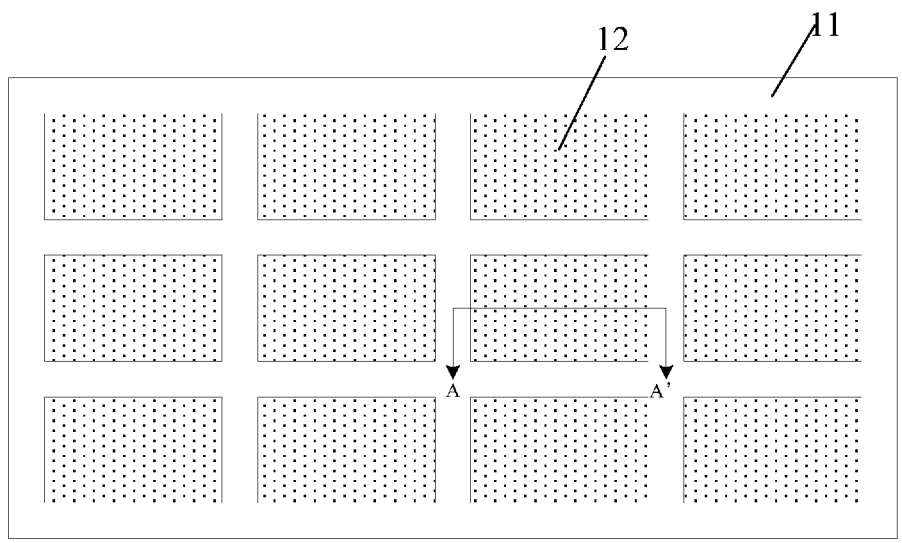
FIG. 1A is a structural schematic diagram of a top view of a color filter provided by an embodiment of the disclosure.

As shown in FIG. 1A, a color filter provided by an embodiment of the disclosure includes: a substrate 11 and a plurality of color film layers 12 distributed in an array and arranged on the substrate 11.

Figure 1B:
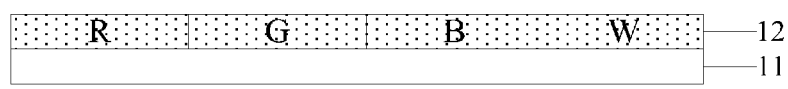
FIG. 1B is a structural schematic diagram of a cross section of a color film layer provided by an embodiment of the disclosure.
Figure 1C:
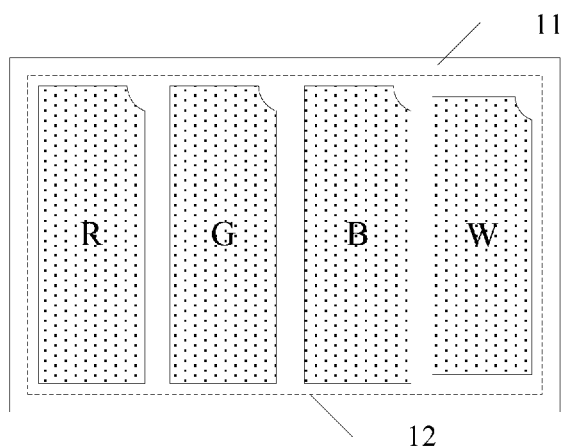
FIG. 1C is a structural schematic diagram of a top view of a color film layer provided by an embodiment of the disclosure.

As shown in FIG. 1B which is the sectional view along the direction AA' as shown in FIG. 1A, each color film layer 12 includes: a red color film R, a green color film a blue color film B and a white color film W; wherein, as shown in FIG. 1C, the areas of the red color film R, the green color film G and the blue color film B are all larger than the area of the white color film W.

Optionally, in an actual application, the emergent light of the backlight source is generally the white light, so the above-mentioned white color film can use the colorless and transparent materials. Compared with the color film of three primary colors of red, green and blue, the color film of red, green, blue and white (RGBW) adds the white color film W, which can increase the transmittance of the panel effectively, increase the brightness and reduce the whole power consumption. But, because the brightness of the panel is increased, the brightness of the white color film W part is higher than the brightness of the part of the red color film R, the green color film G and the blue color film B, so that the color saturation of the panel is reduced and the display quality is reduced. Therefore, in the above-mentioned color filter provided by the embodiment of the disclosure, as shown in FIG. 1C, the area of the white color film W is set to be smaller than the areas of all the other color films, i.e., the aperture ratio of the white color film W is reduced, and meanwhile, the aperture ratios of three colors of red, green and blue is adjusted so that the overall transmittance of three colors of red, green and blue rises with respect to the transmittance of the white color film W, so it can be ensured that the display panel and the display device have the higher display brightness, and also the display color saturation can be increased, to improve the display quality.

In a specific implementation, the ratio of the aperture ratios of all the color films, i.e., the area ratio of all the color films, can be adjusted according to the practically required transmittance ratio of the color film of three colors of red, green and blue to the white color film. Here, the transmittance of each color film is the product of the aperture ratio of the color film with the material transmittance of the color film. Because the material transmittance of each color film is a fixed value after determining the materials of each color film and the thickness of each color film, the transmittance of the color film is positively correlated with the aperture ratio of the color film.

Optionally, in the above-mentioned color filter provided by the embodiment of the disclosure, when the ratio of the overall transmittance of the red color film R, the green color film G and the blue color film B to the transmittance of the white color film W is 49:51 and the color temperature of the color filter is 10000K, the calculated ratio of the aperture ratios of all the color films can be simulated according to the relation between the transmittances and the color coordinates and the relation between the color temperatures and the color coordinates.

Optionally, when the display panel uses the transmittance and the color temperature described above, both of the display brightness and the color saturation thereof can achieve the user requirements. Under this premise, the area ratio of the red color film R, the green color film G, the blue color film B and the white color film W (the ratio of the aperture ratios of all the color films) is designed to be 1.03:1.06:1.0:0.95.

The calculation process of the ratio of the aperture ratios of all the color films will be illustrated below in details.

As described above, after the materials of each color film and the thickness of each color film are determined, the material transmittance of the color film is a fixed value. The following simulated calculation processes are all performed under the premise of determining the material transmittance. Here, the material transmittance of the red color film R is $T_R(\lambda)$, the material transmittance of the green color film G is $T_G(\lambda)$, the material transmittance of the blue color film B is $T_B(\lambda)$, and the material transmittance of the white color film W is $T_W(\lambda)$; and the aperture ratios of the red color film R, the green color film G and the blue color film B and the white color film W are represented by $n_1$, $n_2$, $n_3$, $n_4$ respectively. Then the overall transmittance $T(\lambda)$ of the color film filter can be represented as:

$$T(\lambda)=n_1T_R(\lambda)+n_2T_G(\lambda)+n_3T_B(\lambda)+n_4T_W(\lambda).$$

When it is required that the ratio of the overall transmittance of the red color film R, the green color film G and the blue color film B to the transmittance of the white color film W is 49:51, the following relation is met:

$$(n_1T_R(\lambda)+n_2T_G(\lambda)+n_3T_B(\lambda)):n_4T_W(\lambda)=49:51.$$

In order to represent the colors, Commission Internationale Ed l'eclairage (CIE) specifies two kinds of color system. In the 1931-XYZ color system, the tristimulus values can be configured to represent a kind of color, while the tristimulus values of each color film are also the fixed value under the premise that the materials of each color film and the thickness of the color film are determined. If the tristimulus values are represented by X, Y and Z respectively, according to the definition, the tristimulus values can be represented as:

$$X=K\smallint_{380}^{780}S(\lambda)\bar{x}(\lambda)R(\lambda)d\lambda,$$

$$Y=K\smallint_{380}^{780}S(\lambda)\bar{y}(\lambda)R(\lambda)d\lambda,$$

$$Z=K\smallint_{380}^{780}S(\lambda)\bar{z}(\lambda)R(\lambda)d\lambda,$$

wherein $S(\lambda)$ is the light source function, $\bar{x}(\lambda)$, $\bar{y}(\lambda)$, $\bar{z}(\lambda)$ are the color matching functions, $R(\lambda)$ is the color resist spectrum, and $K=100/\smallint_{330}^{780}S(\lambda)\bar{y}(\lambda)d\lambda$ is the normalized constant. Then the tristimulus values corresponding to the red color film R is $(R_X, R_Y, R_Z)$, the tristimulus values corresponding to the green color film G is $(G_X, G_Y, G_Z)$, the tristimulus values corresponding to the blue color film B is $(B_X, B_Y, B_Z)$, and the tristimulus values corresponding to the white color film W is $(W_X, W_Y, W_Z)$.

And the relation between the color coordinates (x, y) and the tristimulus values is:

$$x=X/(X+Y+Z);$$

$$y=Y/(X+Y+Z).$$

And the calculation formula of the Color Temperature (CT) and the color coordinates is:

$$CT=437\times m^3+3601\times m^2+6831\times m+5517;$$

wherein $m=(x-0.332)/(0.1858-y)$, and (x, y) is the values of the color coordinates.

However, under the premise that the tristimulus values of four kinds of color films are determined, the tristimulus values corresponding to the color filter are:

$$X=n_1R_X+n_2G_X+n_3B_X+n_4W_X;$$

$$Y=n_1R_Y+n_2G_Y+n_3B_Y+n_4W_Y;$$

$$Z=n_1R_Z+n_2G_Z+n_3B_Z+n_4W_Z;$$

The color coordinates (x, y) of the color filter can be calculated in combination with the above-mentioned relation between the color coordinates and the tristimulus values, so that the relation between the aperture ratios and the color temperatures of all the color films can be established when it is required that the color temperature CT=10000K. When it is assumed that the aperture ratio of the red color film R meets $n_1=1$, the above color temperature formula can be expanded to obtain the first relation as follows:

$$(C_0+10000)(C_1n_3^3+C_2n_3^3+C_3n_2^2+C_4n_3^2+C_5n_3^2+C_6n_3n_2n_4+C_7n_2^2n_4+C_8n_3n_4^2+C_9n_2n_4^2+C_{10}n_4^3)=0.$$

Further, according to the above relation:

$$(n_1T_R(\lambda)+n_2T_G(\lambda)+n_3T_B(\lambda)):n_4T_W(\lambda)=49:51.$$

the substituting of all the known material transmittances can obtain the second relation as follows:

$$C_{11}n_2+C_{12}n_3+C_{13}+(49:51)C_{14}n_4=0.$$

However, in an actual application, the transmittance should be maintained as much as possible without loss, that is, the transmittances of the color filter are almost equal before and after the aperture ratios of all the color films are changed:

$$n_1T_R(\lambda)+n_2T_G(\lambda)+n_3T_B(\lambda))n_4T_W(\lambda)\approx n_1'T_R(\lambda)+n_2'T_G(\lambda)+n_3'T_W(\lambda);$$

wherein $n_1'$, $n_2'$, $n_3'$, $n_4'$ are the aperture ratios of all the color films of the existing color film filter which is not changed, and generally, $n_1':n_2':n_3':n_4'=1:1:1:1$. The substituting of all the known material transmittances can obtain the third relation as follows:

$$C_{15}(n_2-1)+C_{16}(n_3-1)+C_{17}(n_4-1)\approx 0;$$

wherein $C_x$ is the known constant in the three relations described above. The three equations of $n_2$, $n_3$ and $n_4$ are obtained under the premise of $n_1=1$, so that the values of $n_2$, $n_3$ and $n_4$ can be calculated according to the three equations described above, to thereby calculate the ratio of $n_1$, $n_2$, $n_3$ and $n_4$.

Optionally, in the above-mentioned color filter provided by the embodiment of the disclosure, when it is required that the ratio of the overall transmittance of the red color film R, the green color film G and the blue color film B to the transmittance of the white color film W is 49:51 and the color temperature is 10000K, the ratio of the aperture ratios of the red color film R, the green color film G, the blue color film B and the white color film W is 1.03:1.06:1.0:0.95. In an actual application, if there are other requirements on the transmittance and the color temperature, the suitable ratio of the aperture ratios of all the color films can be obtained according to the above-mentioned calculation process.

The embodiment of the disclosure further tests the color film filter before and after the aperture ratios of all the color films are changed.

When the ratio of the aperture ratios of the red color film R, the green color film G, the blue color film B and the white color film W is 1:1:1:1, the actual measurement result meeting the color gamut condition is: the ratio of the overall transmittance of the red color film R, the green color film G and the blue color film B to the transmittance of the white color film W is 43:57, the whole transmittance is 7.82%, and the color temperature is 11200K.

However, when the ratio of the aperture ratios of the red color film R, the green color film the blue color film B and the white color film W is 1.03:1.06:1.0:0.95, the actual measurement result meeting the color gamut condition is: the ratio of the overall transmittance of the red color film R, the green color film G and the blue color film B to the transmittance of the white color film W is 49:51, the whole transmittance is 7.79%, and the color temperature is 10200K.

As can be seen from this, after the ratio of the aperture ratios of all the color films are changed, the whole transmittance of the color filter is basically unchanged, and the transmittance ratio and the color temperatures of the color films are in the required ranges. Thus the display brightness and the color saturation can be increased under the condition of meeting the color gamut.

Optionally, in the above-mentioned color filter provided by the embodiment of the disclosure, as shown in FIG. 1C, the shapes of the red color film R, the green color film G, the blue color film B and the white color film W can be same. In order to simplify the fabrication process and also facilitate the calculation of the aperture ratio, the shapes of all the color films can be set to be same.

Figure 2:
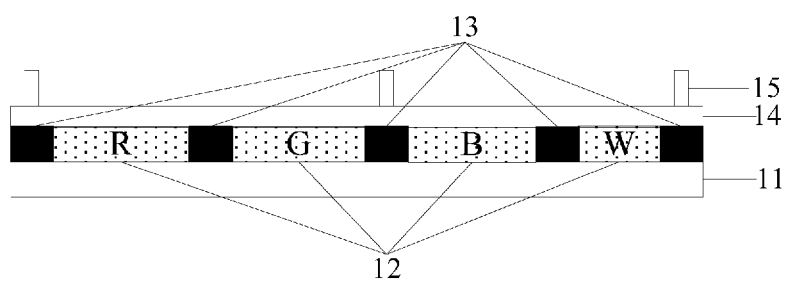
FIG. 2 is a structural schematic diagram of a cross section of a color filter provided by an embodiment of the disclosure.

Optionally, in the above-mentioned color filter provided by the embodiment of the disclosure, as shown in FIG. 2, the color filter can further include: a light shielding layer 13 arranged on the substrate 11 and configured to space the red color film R, the green color film G, the blue color film B and the white color film W, a planar layer 14 arranged at one side of the color film layers 12 and the light shielding layer 13 back on to the substrate 11, and a plurality of spacers 15 arranged at one side of the planar layer 14 back on to the color film layers 12 and the light shielding layer 13.

Optionally, the above-mentioned color filter can be applied to the liquid crystal display device, and can also be applied to the organic light emitting display device in the mode of the white light organic light emitting diode display panel in combination with the color filter. When applied to the liquid crystal display device, an electrode layer can further be fabricated on the planar layer 14, where the electrode layer and the electrodes in the array substrate in the liquid crystal display device constitute the electric field to control the liquid crystals to deflect.

Optionally, in an actual application, in order to ensure the transmittance of the color filter, all the materials of the planar layer 14 and the spacers 15 are the transparent materials with the high transmittance. The white color film W can also be fabricated by two ways of patterning and coating. After the patterns of all the color films are formed by using the patterning process, the white color film W can be made from the same materials as the spacers 15 directly at the position of the white color film W, and then the photoresists are stripped to form the pattern of the color film layer. However, when the fabrication is performed by way of coating, the same materials as the planar layer 14 can be coated directly after the patterns of the red color film R, the green color film G and the blue color film B are formed, so that the white color film W can be formed at the position of the white color film W.

Based upon the same inventive concept, an embodiment of the disclosure provides a display panel, which includes any color filter described above, where the display panel is in the color light emission mode of the white backlight in combination with the color filter.

Based upon the same inventive concept, a specific embodiment of the disclosure provides a display device, which includes the above-mentioned display panel provided by the specific embodiment of the disclosure. The display device can be a liquid crystal display panel, a liquid crystal display, a liquid crystal television, an Organic Light Emitting Diode (OLED) panel, an OLED display, an OLED television, an electronic paper or another display device.

Figure 3A:
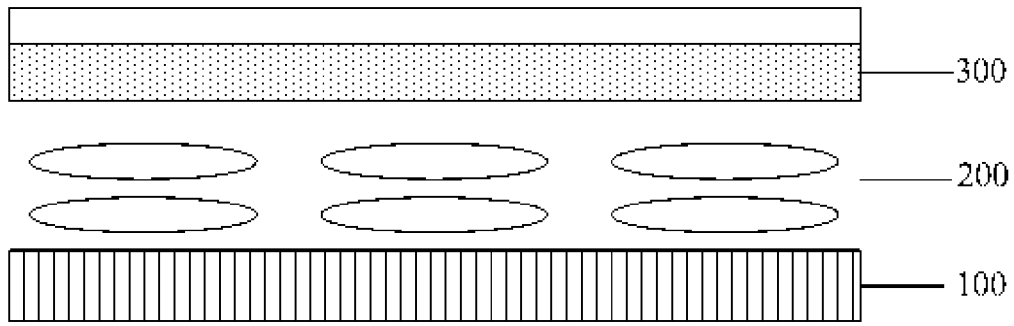
FIG. 3A is the first one of the structural schematic diagrams of a display device provided by an embodiment of the disclosure.

Optionally, when the above-mentioned display device is the liquid crystal display device, as shown in FIG. 3A, it can include: an array substrate 100, a color filter 300, and a liquid crystal layer 200 sandwiched between the array substrate 100 and the color filter 300.

Figure 3B:
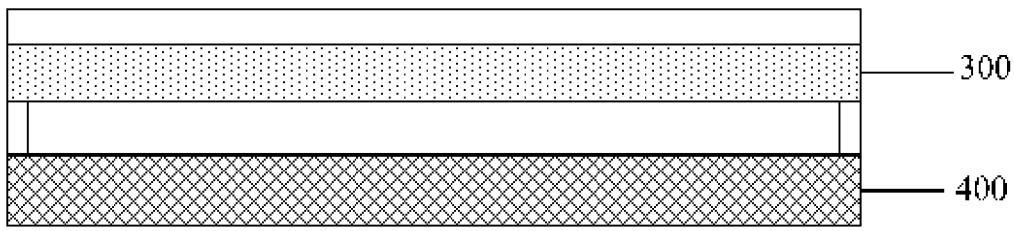
FIG. 3B is the second one of the structural schematic diagrams of a display device provided by an embodiment of the disclosure.

When the above-mentioned display device is the organic light emitting display device, as shown in FIG. 3B, it can include: an organic light emitting diode display panel 400, and a color filter 300 at the light-emitting side of the organic light emitting diode display panel 400.

Figure 4A:
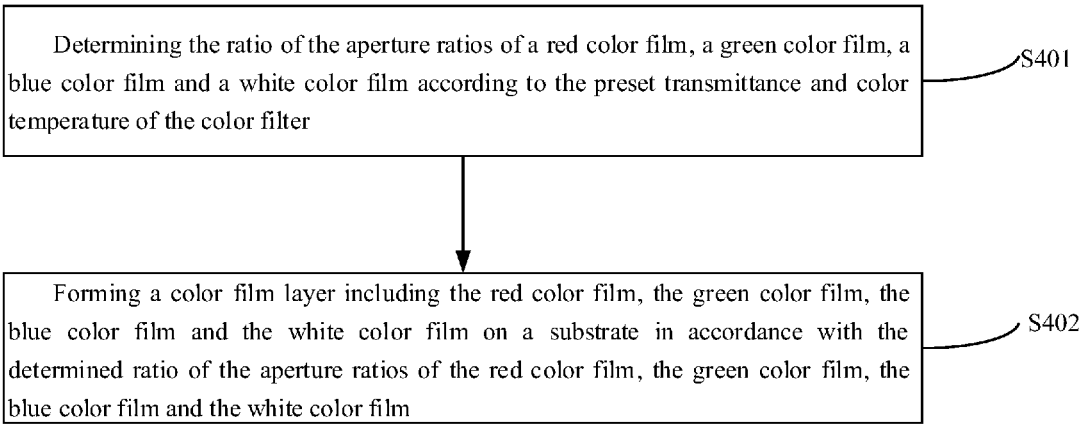
FIG. 4A is the first one of the schematic flow charts of a fabrication method of a color filter provided by an embodiment of the disclosure.

In addition to this, an embodiment of the disclosure provides a fabrication method of a color filter, and as shown in FIG. 4a, the fabrication method includes the steps of:

S401: determining the ratio of the aperture ratios of a red color film, a green color film, a blue color film and a white color film according to the preset transmittance and color temperature of the color filter;

S402: forming a color film layer including the red color film, the green color film, the blue color film and the white color film on a substrate in accordance with the determined ratio of the aperture ratios of the red color film, the green color film, the blue color film and the white color film.

Here, the aperture ratios of the red color film, the green color film and the blue color film are all larger than the aperture ratio of the white color film.

Optionally, by making the aperture ratio of the white color film smaller than the aperture ratios of all the other color films, the overall transmittance of three colors of red, green and blue rises with respect to the transmittance of the white color film, so it can be ensured that the display device has the higher display brightness, and also the display color saturation can be increased, to improve the display quality.

Optionally, in the above step S401, determining the ratio of the aperture ratios of the red color film, the green color film, the blue color film and the white color film according to the preset transmittance and color temperature of the color filter, includes the substeps of:

determining the color coordinates of all the color films according to the materials of all the color films;

determining the ratio of the aperture ratios of the red color film, the green color film, the blue color film and the white color film according to the relation between the color coordinates and the color temperatures of all the color films, the relation between the aperture ratios and the transmittances of all the color films, the relation between the transmittances and the color coordinates, and the preset transmittance and color temperature of the color filter.

The relations among the color coordinates, the transmittances, the an aperture ratios and the color temperatures of all the color films as well as the specific calculation processes can refer to the calculation processes described above, and will be omitted here.

Optionally, when the preset ratio of the overall transmittance of the red color film, the green color film and the blue color film to the transmittance of the white color film in the color filter is 49:51 and the color temperature of the color filter is 10000K, the ratio of the aperture ratios of the red color film, the green color film, the blue color film and the white color film is determined as 1.03:1.06:1.0:0.95.

After the ratio of the aperture ratios of all the color films is determined, the mask plate forming the color film layer can further be designed, and finally the pattern of the color film layer is formed by way of exposing and developing.

Figure 4B:
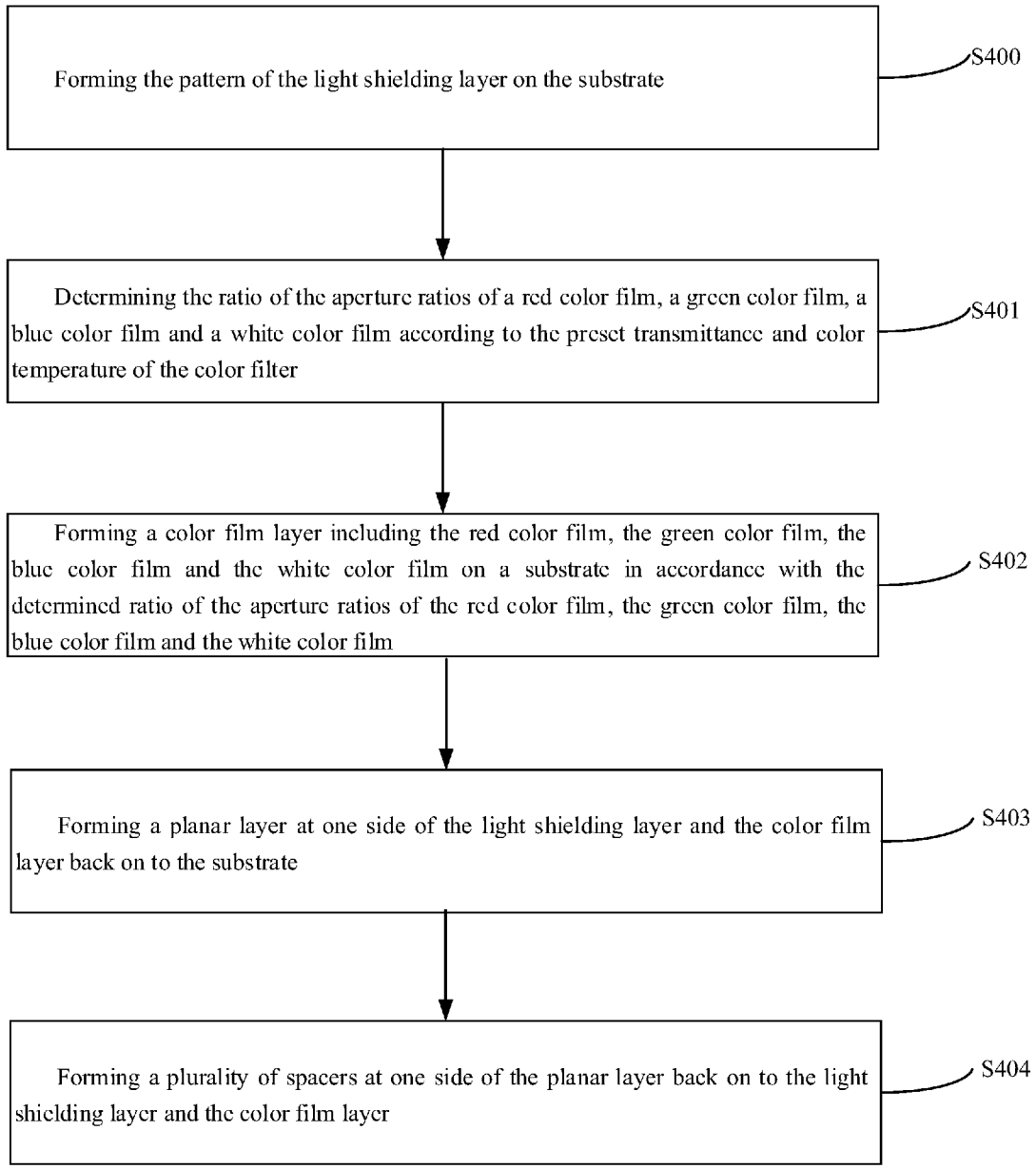
FIG. 4B is the second one of the schematic flow charts of a fabrication method of a color filter provided by an embodiment of the disclosure.

Optionally, in the above-mentioned fabrication method of the color filter provided by the embodiment of the disclosure, as shown in FIG. 4B, before the above step S401, the fabrication method can further include the step of:

S400: forming the pattern of the light shielding layer on the substrate.

Here, the color film layer and the light shielding layer have the complementary patterns and are both formed on the substrate. The light shielding layer is configured to space the regions of all the color films.

Optionally, in the above-mentioned fabrication method of the color filter provided by the embodiment of the disclosure, as shown in FIG. 4B, after the above step S402, the fabrication method can further include the step of:

S403: forming a planar layer at one side of the light shielding layer and the color film layer back on to the substrate;

S404: forming a plurality of spacers at one side of the planar layer back on to the light shielding layer and the color film layer.

Here, the materials of the white color film are same as the materials of the planar layer, and at this time, the same materials as the planar layer can be coated directly after the patterns of the red color film, the green color film and the blue color film are formed, so that the white color film can be formed at the position of the white color film; or the materials of the white color film are same as the materials of the spacers, the white color film can be made from the same materials as the spacers directly at the position of the white color film, and then the photoresists are stripped to form the pattern of the color film layer.

The embodiments of the disclosure provide the color filter, the fabrication method thereof and the display device. The color filter includes a plurality of filter units distributed in an array; each filter unit includes: a substrate and a color film layer arranged on the substrate; the color film layer includes a red color film, a green color film, a blue color film and a white color film; and the areas of the red color film, the green color film and the blue color film are all larger than the area of the white color film. By setting the area of the white color film to be smaller than the areas of all the other color films, i.e., reducing the aperture ratio of the white color film, and also adjusting the aperture ratios of three colors of red, green and blue, the overall transmittance of three colors of red, green and blue rises with respect to the transmittance of the white color film, so it can be ensured that the display device has the higher display brightness, and also the display color saturation can be increased, to improve the display quality.

Although the preferred embodiments of the disclosure have been described, those skilled in the art can make additional alterations and modifications to these embodiments once they learn about the basic creative concepts. Thus the attached claims are intended to be interpreted to include the preferred embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A color filter comprising: a substrate and a plurality of color film layers distributed in an array and arranged on the substrate;
    the color film layers comprise: a red color film, a green color film, a blue color film and a white color film;
    an area of each of the red color film, the green color film and the blue color film is larger than an area of the white color film;
    wherein a ratio of an overall transmittance of the red color film, the green color film and the blue color film to a transmittance of the white color film is 49:51, and a color temperature of the color filter is 10000K;
    wherein a transmittance of each color film is a product of an aperture ratio of the each color film with a material transmittance of the each color film;
    wherein a ratio of aperture ratios of all color films is determined according to following formulas:

$$(C_0+10000)(C_1 n_3^3 + C_2 n_3^2 n_2 + C_3 n_3 n_2^2 + C_4 n_2^3 + C_5 n_3^2 n_4 + C_6 n_3 n_2 n_4 + C_7 n_2^2 n_4 + C_8 n_3 n_4^2 + C_9 n_2 n_4^2 + C_{10} n_4^3) = 0;$$

$$C_{11} n_2 + C_{12} n_3 + C_{13} + (49:51) C_{14} n_4 = 0;$$

$$C_{15}(n_2-1) + C_{16}(n_3-1) + C_{17}(n_4-1) \approx 0;$$

wherein $n_1=1$, an aperture ratio of the red color film is represented by $n_1$, an aperture ratio of the green color film is represented by $n_2$, an aperture ratio of the blue color film is represented by $n_3$, an aperture ratio of the white color film is represented by $n_4$, and $C_x$ is a constant.

2. The color filter of claim 1, wherein an area ratio of the red color film, the green color film, the blue color film and the white color film is 1.03:1.06:1.0:0.95.

3. The color filter of claim 1, wherein, shapes of the red color film, the green color film, the blue color film and the white color film are same.

4. A display panel, comprises the color filter of claim 1.

5. The color filter of claim 1, further comprises: a light shielding layer arranged on the substrate and configured to space the red color film, the green color film, the blue color film and the white color film, a planar layer arranged at one side of the color film layers and the light shielding layer back on to the substrate, and a plurality of spacers arranged at one side of the planar layer back on to the color film layers and the light shielding layer.

6. The color filter of claim 5, wherein materials of the white color film are same as materials of the planar layer; or the materials of the white color film are same as materials of the spacers.

7. A display device, comprises the display panel of claim 4.

8. The display panel of claim 4, wherein a ratio of an overall transmittance of the red color film, the green color film and the blue color film to a transmittance of the white color film is 49:51, and a color temperature of the color filter is 10000K; wherein,
a transmittance of each color film is a product of an aperture ratio of the each color film with a material transmittance of the each color film.

9. The display panel of claim 8, wherein an area ratio of the red color film, the green color film, the blue color film and the white color film is 1.03:1.06:1.0:0.95.

10. The display panel of claim 4, wherein shapes of the red color film, the green color film, the blue color film and the white color film are same.

11. The display panel of claim 4, wherein the color filter further comprises: a light shielding layer arranged on the substrate and configured to space the red color film, the green color film, the blue color film and the white color film, a planar layer arranged at one side of the color film layers and the light shielding layer back on to the substrate, and a plurality of spacers arranged at one side of the planar layer back on to the color film layers and the light shielding layer.

12. The display panel of claim 11, wherein materials of the white color film are same as materials of the planar layer; or the materials of the white color film are same as materials of the spacers.

13. A fabrication method of a color filter, comprises:
determining a ratio of aperture ratios of a red color film, a green color film, a blue color film and a white color film according to a preset transmittance and color temperature of the color filter;
forming a color film layer comprising the red color film, the green color film, the blue color film and the white color film on a substrate according to determined ratio of the aperture ratios of the red color film, the green color film, the blue color film and the white color film;
wherein,
the aperture ratios of the red color film, the green color film and the blue color film are all larger than the aperture ratio of the white color film;
wherein a ratio of an overall transmittance of the red color film, the green color film and the blue color film to a transmittance of the white color film is 49:51, and a color temperature of the color filter is 10000K;
wherein a transmittance of each color film is a product of an aperture ratio of the each color film with a material transmittance of the each color film;
wherein a ratio of aperture ratios of all color films is determined according to following formulas:
wherein $n_1=1$, an aperture ratio of the red color film is represented by $n_1$, an aperture ratio of the green color film is represented by $n_2$ an aperture ratio of the blue color film is represented by $n_3$, an aperture ratio of the white color film is represented by $n_4$, and $C_x$ is a constant.

14. The fabrication method of claim 13, wherein determining a ratio of aperture ratios of a red color film, a green color film, a blue color film and a white color film according to a preset transmittance and color temperature of the color filter, comprises:
determining color coordinates of all color films according to materials of all the color films;
determining the ratio of the aperture ratios of the red color film, the green color film, the blue color film and the white color film according to a relation between the color coordinates and color temperatures of all the color films, a relation between the aperture ratios and transmittances of all the color films, a relation between the transmittances and the color coordinates, and the preset transmittance and color temperature of the color filter.

15. The fabrication method of claim 13, wherein determining a ratio of aperture ratios of a red color film, a green color film, a blue color film and a white color film according to a preset transmittance and color temperature of the color filter, comprises:
determining that the ratio of the aperture ratios of the red color film, the green color film, the blue color film and the white color film is 1.03:1.06:1.0:0.95 when a preset ratio of an overall transmittance of the red color film, the green color film and the blue color film to a transmittance of the white color film in the color filter is 49:51 and a color temperature of the color filter is 10000K.

16. The fabrication method of claim 13, wherein before forming the color film layer on the substrate in accordance with the determined ratio of the aperture ratios of the red color film, the green color film, the blue color film and the white color film, the fabrication method further comprises:
forming a pattern of a light shielding layer on the substrate.

17. The fabrication method of claim 16, wherein after forming the color film layer on the substrate in accordance with the determined ratio of the aperture ratios of the red color film, the green color film, the blue color film and the white color film, the fabrication method further comprises:
forming a planar layer at one side of the light shielding layer and the color film layer back on to the substrate;
forming a plurality of spacers at one side of the planar layer back on to the light shielding layer and the color film layer.

18. The color filter of claim 17, wherein materials of the white color film are same as materials of the planar layer; or materials of the white color film are same as materials of the spacers.

* * * * *